United States Patent [19]

Van Acker

[11] 3,717,855

[45] Feb. 20, 1973

[54] MAGNETIC HEAD UNIT

[75] Inventor: Paul Antonius Ferdinand Van Acker, Rijswijk, Netherlands

[73] Assignee: U.S. Philips Corporation, New York, N.Y.

[22] Filed: Sept. 13, 1971

[21] Appl. No.: 179,873

[30] Foreign Application Priority Data

Sept. 29, 1970 Netherlands ........................7014265

[52] U.S. Cl. ...............................340/174.1 E, 274/47

[51] Int. Cl. ............................G11b 5/60, G11b 3/58

[58] Field of Search...340/174.1 F, 174.1 E, 174.1 L; 179/100.2 C, 100.2 CA, 100.2 P; 274/47

[56] References Cited

UNITED STATES PATENTS 3,366,390 1/1968 Applequist ............................274/47
3,310,792 3/1967 Groom et al. ..................340/174.1 E
3,609,721 9/1971 Meneley .......................340/174.1 E

*Primary Examiner*—Vincent P. Canney
*Attorney*—Frank R. Trifari

[57] ABSTRACT

A magnetic head unit for use in a data processing apparatus employing magnetizable recording discs, which unit comprises a plate-shaped support and a flat box which is made of sheet material and is secured to the support and defines a chamber which may be connected to a source of a pressurized fluid and has two openings which are closed by diaphragms. When pressure is set up in the chamber, one of the diaphragms moves a magnetic head, which is secured in a shoe and is resiliently connected to the support, in a direction towards the recording disc, while by means of the other diaphragm a brush pivotally supported on the support is lifted from the recording disc against a spring force under the influence of the fluid pressure.

5 Claims, 5 Drawing Figures

Figure 1:
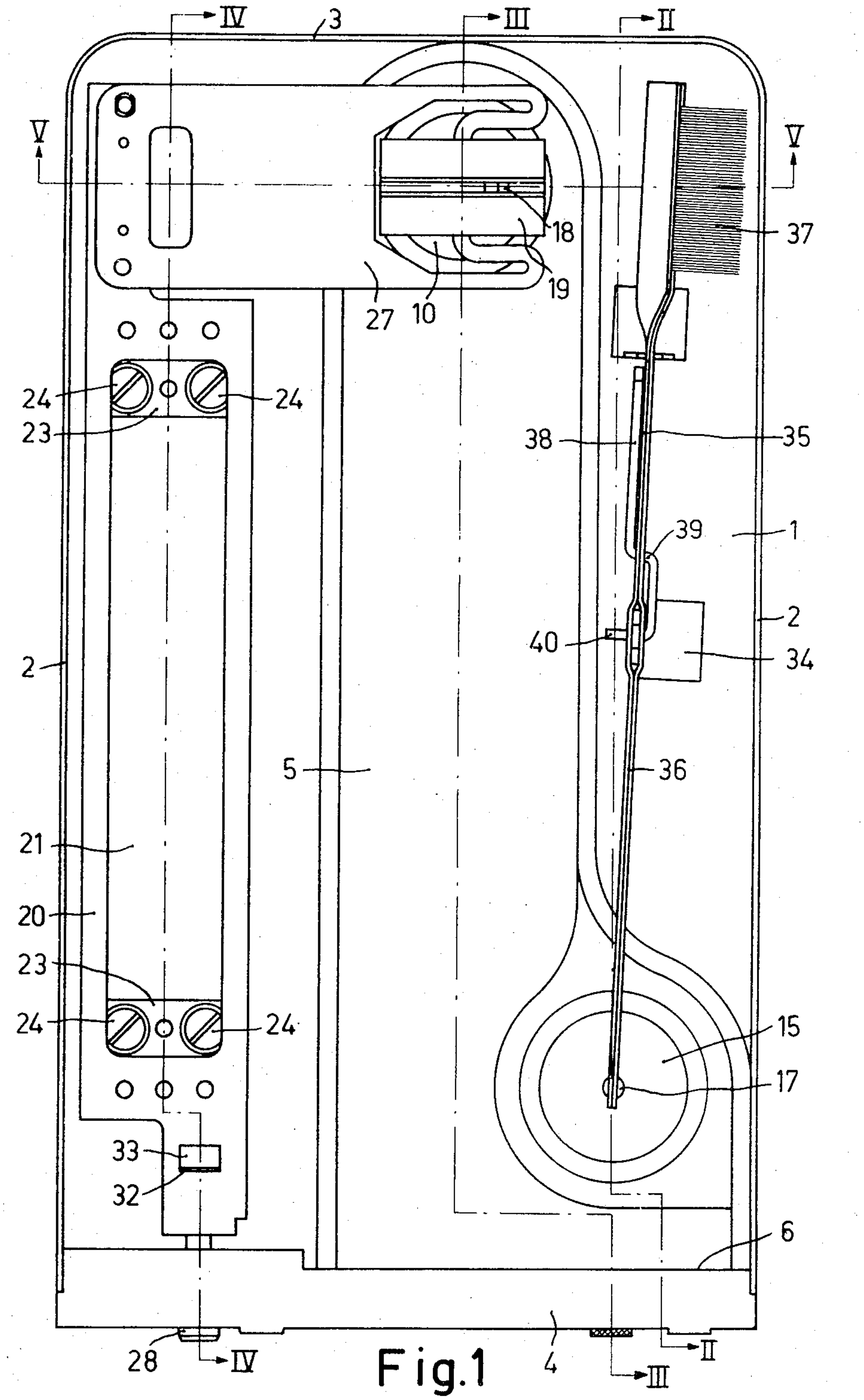

INVENTOR.
PAUL ANTONIUS FERDINAND VAN ACKER
BY
Agent

INVENTOR.
PAUL ANTONIUS FERDINAND VAN ACKER

BY Frank R. Trifari
Agent

MAGNETIC HEAD UNIT

The invention relates to a magnetic head unit for use in an apparatus for processing data in the form of magnetic recordings on disc-shaped recording surfaces, which magnetic head unit associated with a recording surface comprises a support, a magnetic head secured in a shoe, and resilient means by which the shoe is connected to the support, the support including a chamber which is adapted to be connected to a source of a pressurized fluid and is provided with an opening which is closed by a diaphragm by means of which the shoe together with the magnetic head is movable in a direction towards the recording surface under the influence of the pressure of the fluid.

A unit of this type is known from Netherlands Pat. specification No. 125,181. In the condition in which in this known unit no pressurized fluid is supplied to the chamber in the support, the shoe together with the magnetic head is held in a retracted position relative to the recording surface under the influence of the resilient means, whilst when pressurized fluid is supplied a force is exerted on the diaphragm which moves the shoe together with the magnetic head towards the recording surface. It is also known to equip apparatus for data processing by means of at least one recording disc with brushes for removing any dust from the recording discs. Comparatively complicated mechanisms are required to move such a brush towards and away from a recording disc.

According to the invention a magnetic head unit of the type defined at the beginning of this specification is characterized in that there is mounted on the support a brush member which is movable towards the recording surface under the influence of a spring force, and in the opposite direction, against the spring force, under the influence of the pressure of the fluid.

The steps according to the invention provide a very compact construction which is greatly simplified in comparison with the known embodiments, and in which the pressurized fluid used for controlling the magnetic head is also used for operating the brush member in a specific manner such as to enable the brush member to co-operate with the recording surface to remove the dust therefrom in the retracted position of the magnetic head, whilst when pressurized fluid is supplied the head is moved to the recording position and at the same time the brush member is lifted from the recording surface. According to the invention, the chamber preferably contains a second opening which is closed by a diaphragm, the brush member being movable in the said opposite direction by means of this diaphragm under the influence of the fluid pressure.

A suitable embodiment of the invention consists in that the support is a substantially flat rectangular base plate and the chamber is in the form of a box which is made of a sheet material and is secured to the base plate, and the brush member having a stem which between its ends in a plane substantially at right angles to the base plate is pivotally supported in a bearing provided on the base plate aside the box, and is provided with brush hairs at one end and is arranged to be loaded by the fluid pressure at the opposite end by means of the diaphragm disposed in the second opening, whilst a spring is interposed between the base plate and the brush stem which counteracts a force exerted by the pressurized fluid on the pivoting stem. These steps according to the invention provide a magnetic head unit of little weight which may simply and cheaply be manufactured.

According to the invention, the resilient means by which the shoe is connected to the support, preferably comprise an elongate supporting plate, which is connected to the support with the interposition of two Z-shaped resilient elements located one behind the other in the direction of length of the supporting plate, and is displaceable parallel to itself in directions according to the longitudinal axis, and a leaf spring one end of which is secured to an end of the supporting plate and on the other end of which is mounted the shoe together with the magnetic head, the longitudinal axes of the supporting plate and of the leafspring, which are situated in substantially parallel planes, crossing each other at right angles, and means which enable the position of the supporting plate relative to the support to be adjusted. This embodiment enables the shoe together with the magnetic head to be adjusted with a high degree of accuracy. The said means preferably take the form of a set screw having a first threaded portion adapted to be screwed in an internally threaded bore of the support, and a second threaded portion cooperating with a nut plate which projects in a slot of the supporting plate.

Figure 2:
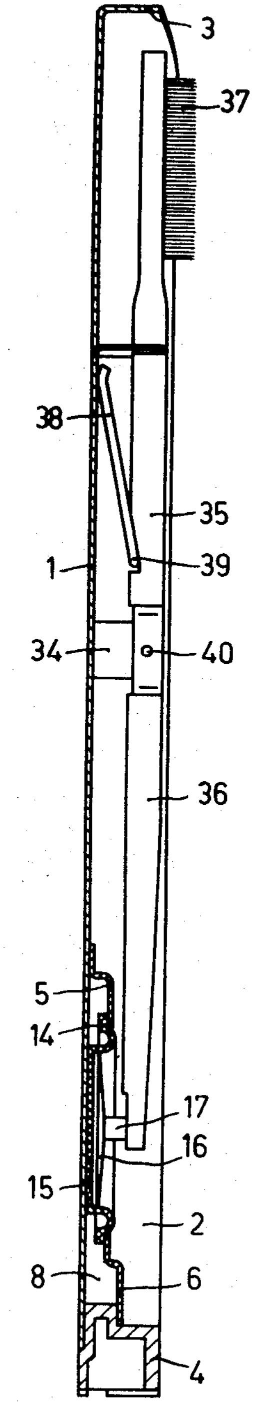
Figure 3:
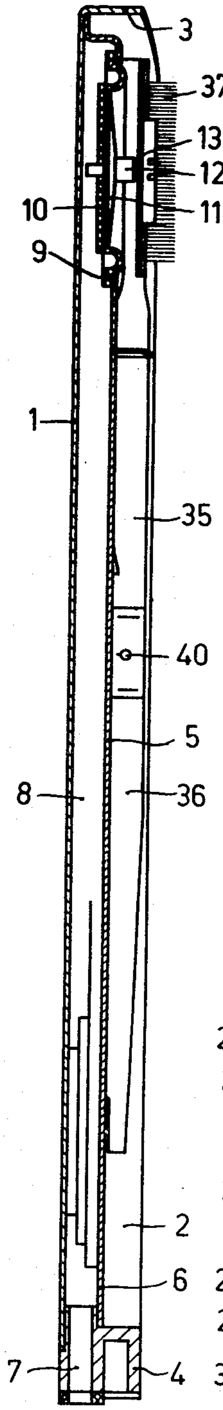
Figure 4:
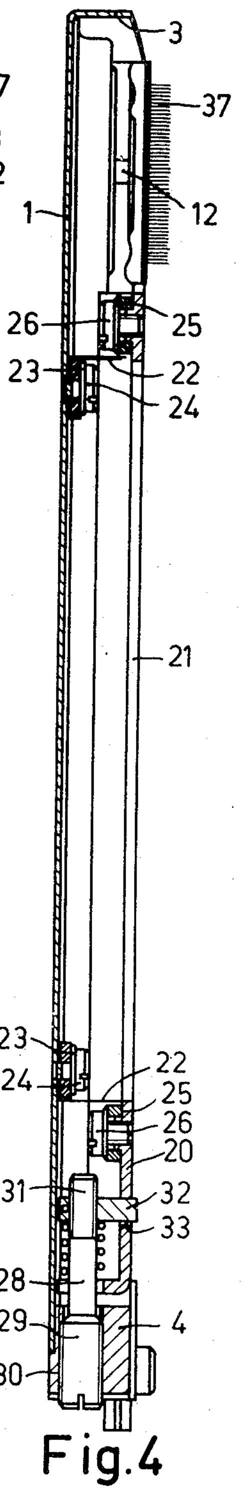
Figure 5:
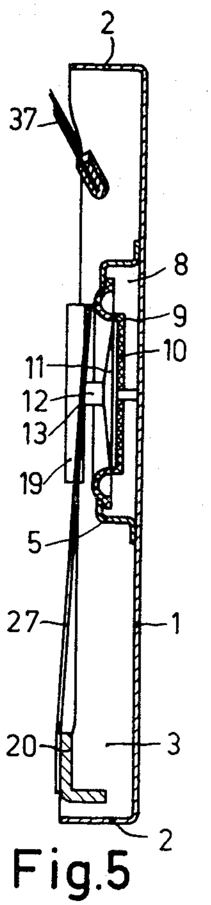

An embodiment of the invention will now be described, by way of example, with reference to the accompanying diagrammatic drawings, in which FIG. 1 is a top plan view of a magnetic head unit according to the invention, FIG. 2 is a longitudinal sectional view taken on the line II—II OF FIG. 1, FIG. 3 is a longitudinal sectional view taken on the line III—III of FIG. 1, FIG. 4 is a longitudinal sectional view taken on the line IV—IV OF FIG. 1, and FIG. 5 is a cross-sectional view taken on the line V—V of FIG. 1.

The magnetic head unit according to the invention is intended to be used in an apparatus for processing data in the form of magnetic recordings on disc-shaped recording surfaces, a magnetic head unit being associated with each surface. Referring to the drawing, the magnetic head unit includes a support 1, which is substantially in the shape of a flat rectangular plate which is provided with upstanding edges 2 along its longer sides and with an upstanding edge 3 along one shorter side. A mounting block 4 is secured to the other shorter side of the plate 1.

On one surface of the base plate 1 there is mounted a box 5 which is made of a sheet material and extends between the edge 3 and the mounting block 4 and an open side of which facing the base plate is closed by the plate itself. An open rear side 6 of the box 5, which side is at right angles to the first-mentioned open side, is closed by the mounting block 4. Opposite this rear side 6 there is provided in the mounting block 4 an opening 7 (FIG. 3) to which a source of a pressurized fluid may be connected and through which a pressure may be set up in a chamber 8 bounded by the box 5. The box 5 is provided, near the edge part 3, with an opening 9 in which a diaphragm 10 is secured so as to extend parallel to the base plate. The diaphragm 10 is capable of outward deflection under the influence of the pressure of the fluid in the chamber 8. The diaphragm is centrally provided with a thrust member 11 which carries a cylindrical stud 12 having a flat end face 13 which protrudes from the box 5 (FIGS. 3 and 5), and the purpose of which will be described more fully hereinafter.

At an area near the mounting block 4 the box 5 is provided with a second opening 14 in which, in the same manner as in the first opening 9, there is secured a diaphragm 15 carrying a thrust piece 16 and a thrust stud 17 (FIG. 2). It should be noted that the diaphragms 10 and 15 are arranged at different levels merely for constructional reasons.

The diaphragm 10 serves to move a magnetic head 18 in a direction towards a recording surface of the apparatus by means of the thrust face 13 of the stud 12.The magnetic head 18 is secured in known manner in a shoe 19 which is resiliently connected to the base plate 1 in the following manner. An elongate supporting plate 20 made of sheet material extends aside the box 5 so as to be longitudinally spaced from and parallel to the base plate. The supporting plate 20 is provided with a rectangular aperture 21 to save weight. The supporting plate 20 is connected to the base plate 1 by two Z-shaped resilient elements 22 which are disposed one behind the other in the direction of length of the supporting plate 20. Limbs 23 of the Z-springs 22 are secured to the base plate 1 by bolts 24, whilst limbs 25 of these springs are secured to the supporting plate by bolts 26. Thus the supporting plate 20 is arranged to be displaced along its longitudinal axis parallel to itself. A leaf spring 27 is secured to the end of the supporting plate 20 near the base plate edge 3,and the longitudinal axes of the supporting plate and of the leaf spring, which lie in substantially parallel planes, are askew and at right angles to one another. The shoe 19 with the magnetic head 18 is secured to the end of the leaf spring 27 more remote from the supporting plate. The assembly of the supporting plate and the leaf spring carrying the magnetic head is displaceable in the direction of the longitudinal axis of the supporting plate and may be positioned by means of a set screw 28 which is provided with a first threaded portion 29 adapted to rotate in an internally threaded bore 30 of the mounting block 4 and with a second threaded portion 31 which co-operates with a nut plate 32 which engages in a slot 33 formed in the supporting plate 20.

The base plate is provided, aside the box, with a bearing 34 in which a brush member 35 is supported for rotation in plane at right angles to the base plate. The brush member comprises a plate-shaped stem 36, which extends substantially in the direction of length of the supporting plate and at the end near the edge 3 is provided with brush hairs 37. At the opposite end, the stem 36 is maintained in engagement with the thrust stud 17 of the diaphragm 15 by a resilient element 38 which is bent from spring steel wire and which at one end rests on the base plate, presses against the lower surface of the stem end carrying the brush hairs 37 with a center part 39 bent over at right angles (see in particular FIG. 1), and at the other end terminates in an end part 40 which is bent back at a right angle, is inserted into the bearing 34 and forms the pivot for the brush stem 36.

When the diaphragms 10 and 15 are not loaded by the pressurized fluid, the brush hairs 37 are maintained in contact with the disc-shaped recording surface of the apparatus under the influence of the spring 38. The shoe 19 together with the magnetic head 18 is then in a retracted position relative to the recording surface. When the recording surface is set into rotation, the brush hairs will remove and dust from this surface. If then pressurized fluid is admitted to the chamber 8 in the box 5 through the opening 7 in the mounting block 4, the diaphragms 10 and 15 will be loaded so that the magnetic head is moved towards the recording surface and at the same time the brush hairs are lifted from the recording surface, since the brush stem 36 is pivoted by the thrust stud 17 coupled to the diaphragm 15.

In apparatus in which a plurality of recording discs are spacedly mounted on a spindle so that there are opposed recording surfaces, a combination of two interconnected magnetic head units according to the invention may be used, which each are associated with one of the two opposed recording surfaces.

What is claimed is:

1. A magnetic head unit for use in an apparatus for processing data in the form of magnetic recordings on disc-shaped recording surfaces, which magnetic head unit associated with a recording surface comprises a support, a magnetic head secured in a shoe, and resilient means by which the shoe is connected to the support, the support including a chamber which is adapted to be connected to a source of a pressurized fluid and is provided with an opening which is closed by a diaphragm by means of which the shoe together with the magnetic head is movable in a direction towards the recording surface under the influence of the pressure of the fluid, wherein there is mounted on the support a brush member which is movable towards the recording surface under the influence of a biasing member interposed between said support and the brush member, and movable in the opposite direction, against the biasing influence, under the influence of the pressure of the fluid, whereby the brush member is removed from the recording surface when the magnetic head moves toward said recording surface, and engages said recording surface when said magnetic head is in a retracted position.

2. A magnetic head unit as claimed in claim 1, wherein the chamber has a second opening which is closed by a diaphragm, the brush member being movable in the said opposite direction by means of this diaphragm under the influence of the fluid pressure.

3. A magnetic head unit as claimed in claim 2, wherein the support is a substantially flat rectangular base plate and the chamber is constituted by a box which is made of a sheet material and is secured to the base plate, the brush member having a stem which between its ends in a plane substantially at right angles to the base plate is pivotally supported in a bearing provided on the base plate aside the box and which at one end is provided with brush hairs and at the opposite end is adapted to be loaded by the fluid pressure by means of the diaphragm disposed in the second opening, whilst between the base plate and the brush stem there is arranged a spring which counteracts a force exerted by the pressurized fluid on the stem.

4. A magnetic head unit as claimed in claim 1, wherein the resilient means by which the shoe is connected to the support comprise an elongate supporting plate, which is connected to the support by means of two Z-shaped resilient elements located one behind the other in the direction of length of the supporting plate, and is adapted to be displaced in a direction parallel to itself in directions according to the longitudinal axis and a leaf-spring one end of which is secured to an end of the supporting plate and on the other end of which the shoe together with the magnetic head is mounted, the longitudinal axes of the supporting plate and of the leaf spring, which are situated in substantially parallel planes, crossing each other at right angles, and means which enable the position of the supporting plate relative to the support to be adjusted.

5. A magnetic head unit as claimed in claim 4, wherein the said adjusting means are constituted by a set screw having a first threaded portion adapted to be screwed in an internally threaded bore of the support and a second threaded portion co-operating with a nut plate which projects in a slot of the supporting plate.

* * * * *